(12) United States Patent
Hashimoto et al.

(10) Patent No.: US 11,525,767 B2
(45) Date of Patent: *Dec. 13, 2022

(54) OPTIMIZING METHOD OF SUCTION CONDITION OF MICROPARTICLE AND MICROPARTICLE FRACTIONATING DEVICE

(71) Applicant: Sony Corporation, Tokyo (JP)

(72) Inventors: Gakuji Hashimoto, Kanagawa (JP); Tatsumi Ito, Kanagawa (JP); Kazuya Takahashi, Saitama (JP); Junji Kajihara, Tokyo (JP)

(73) Assignee: Sony Corporation, Tokyo (JP)

( * ) Notice: Subject to any disclaimer, the term of this patent is extended or adjusted under 35 U.S.C. 154(b) by 490 days.

This patent is subject to a terminal disclaimer.

(21) Appl. No.: 16/614,020

(22) PCT Filed: Feb. 14, 2018

(86) PCT No.: PCT/JP2018/004952
§ 371 (c)(1),
(2) Date: Nov. 15, 2019

(87) PCT Pub. No.: WO2018/216269
PCT Pub. Date: Nov. 29, 2018

(65) Prior Publication Data
US 2020/0072732 A1 Mar. 5, 2020

(30) Foreign Application Priority Data
May 24, 2017 (JP) .............................. JP2017-102694

(51) Int. Cl.
*G01N 15/14* (2006.01)
*B01L 3/00* (2006.01)

(52) U.S. Cl.
CPC .... *G01N 15/1484* (2013.01); *B01L 3/502761* (2013.01); *G01N 15/1436* (2013.01);
(Continued)

(58) Field of Classification Search
CPC .......... G01N 15/1484; G01N 15/1436; G01N 2015/149; G01N 15/1486; B01L 3/502671; B01L 2200/0652
See application file for complete search history.

(56) References Cited

U.S. PATENT DOCUMENTS

| | | | |
|---|---|---|---|
| 3,508,654 A * | 4/1970 | Glaettli | G01N 15/1404 210/85 |
| 11,169,074 B2 * | 11/2021 | Hashimoto | G01N 15/1459 |
| 2012/0153185 A1 | 6/2012 | Ito et al. | |
| 2012/0288920 A1 | 11/2012 | Takeda | |

(Continued)

FOREIGN PATENT DOCUMENTS

| | | |
|---|---|---|
| EP | 2 525 209 A1 | 11/2012 |
| JP | 2002-521658 A | 7/2002 |

(Continued)

OTHER PUBLICATIONS

International Search Report dated May 15, 2018 in connection with International Application No. PCT/JP2018/004952, and English translation thereof.

(Continued)

*Primary Examiner* — Michael McCullough
*Assistant Examiner* — Jessica L Burkman
(74) *Attorney, Agent, or Firm* — Wolf, Greenfield & Sacks, P.C.

(57) ABSTRACT

To provide a technology of optimizing a suction condition of a microparticle.
The present technology provides
an optimizing method of a suction condition of a microparticle including:
a particle number counting step of detecting a time point when a microparticle passes through a predetermined (Continued)

position on a main flow path through which liquid containing the microparticle flows, sucking the microparticle from the main flow path to a microparticle suction flow path by the microparticle suction flow path with a predetermined suction force, and counting the number of microparticles sucked into the microparticle suction flow path; and a step of determining an elapsed time from passage through the predetermined position with which the suction by the microparticle suction flow path should be performed on the basis of a time from the time point when the microparticle passes through the predetermined position on the main flow path until the suction is performed and the number of counted microparticles.

10 Claims, 7 Drawing Sheets

(52) U.S. Cl.
CPC .............................. *B01L 2200/0652* (2013.01); *G01N 2015/149* (2013.01)

(56) References Cited

U.S. PATENT DOCUMENTS

| | | |
|---|---|---|
| 2013/0212749 A1 | 8/2013 | Watanabe et al. |
| 2014/0193059 A1* | 7/2014 | Muraki ............. G01N 15/1404 382/133 |
| 2014/0299522 A1 | 10/2014 | Ito |

FOREIGN PATENT DOCUMENTS

| | | |
|---|---|---|
| JP | 2012-127922 A | 7/2012 |
| JP | 2014-036604 A | 2/2014 |
| JP | 2014-202573 A | 10/2014 |
| JP | 2016-057309 A | 4/2016 |
| WO | WO 2016/210128 A1 | 7/2016 |

OTHER PUBLICATIONS

Written Opinion and English translation thereof dated May 15, 2018 in connection with International Application No. PCT/JP2018/004952.

International Preliminary Report on Patentability and English translation thereof dated Dec. 5, 2019 in connection with International Application No. PCT/JP2018/004952.

* cited by examiner

OPTIMIZING METHOD OF SUCTION CONDITION OF MICROPARTICLE AND MICROPARTICLE FRACTIONATING DEVICE

CROSS-REFERENCE TO RELATED APPLICATIONS

This is a U.S. National Stage Application under 35 U.S.C. § 371, based on International Application No. PCT/JP2018/004952, filed in the Japanese Patent Office as a Receiving Office on Feb. 14, 2018, entitled "OPTIMIZING METHOD OF SUCTION CONDITION OF MICROPARTICLE AND MICROPARTICLE FRACTIONATING DEVICE", which claims priority under 35 U.S.C. § 119(a)-(d) or 35 U.S.C. § 365(b) to Japanese Patent Application Number JP2017-102694, filed in the Japanese Patent Office on May 24, 2017, each of which applications is hereby incorporated by reference in its entirety.

TECHNICAL FIELD

The present technology relates to an optimizing method of a suction condition of a microparticle and a microparticle fractionating device. More specifically, the present invention relates to an optimizing method of a suction condition in a technology of sucking the microparticle from a main flow path through which liquid containing the microparticle flows into a microparticle suction flow path, and a microparticle fractionating device which executes the optimizing method.

BACKGROUND ART

Various devices are developed so far to fractionate a microparticle. For example, in a microparticle fractionating system used in a flow cytometer, a laminar flow including sample liquid containing cells and sheath liquid is discharged from an orifice formed in a flow cell or a microchip. At the time of discharge, predetermined vibration is applied to the laminar flow to form a droplet. A moving direction of the formed droplet may be electrically controlled depending on whether or not this includes a target microparticle, so that the target microparticle may be separated.

A technology of fractionating the target microparticle within the microchip without forming the droplet in the above-described manner is also developed.

For example, following Patent Document 1 discloses "A microchip comprising: a sample liquid introduction flow path through which sample liquid containing a microparticle flows; at least a pair of sheath liquid introduction flow paths which joins the sample liquid introduction flow path from both sides to introduce sheath liquid around the sample liquid; a joining flow path communicated with the sample liquid introduction flow path and the sheath liquid introduction flow path in which the liquid flowing through the flow paths join to flow; a negative pressure suction unit communicated with the joining flow path to suck to draw in a microparticle to be recovered; and at least a pair of discharging flow paths provided on both sides of the negative pressure suction unit to be communicated with the joining flow path." (claim 1). In the microchip, the target microparticle is recovered into the negative pressure suction unit by suction.

Furthermore, following Patent Document 2 discloses "A microparticle fractionating method comprising: a procedure of drawing a microparticle in liquid flowing through a main flow path into a branch flow path by generating a negative pressure in the branch flow path communicated with the main flow path, in which a flow of liquid from a side of the branch flow path to a side of the main flow path is formed in a communication port between the main flow path and the branch flow path" (claim 1). In the fractionating method, a non-target particle or sample liquid and sheath liquid containing the same is inhibited from entering a fractionating flow path at the time of non-fractionating operation by a flow of liquid toward the main flow path. Furthermore, following Patent Document 2 also discloses a microparticle for microparticle fractionation capable of carrying out the microparticle fractionating method (claim 9).

In this manner, in the technology of fractionating the target microparticle in the microchip, in a case where the liquid flowing through the main flow path does not contain the target microparticle, the liquid flows, for example, to a discharging flow path, and in a case where the liquid flowing through the main flow path contains the target microparticle, the liquid is guided to a particle fractionating flow path, so that the target microparticle is recovered.

CITATION LIST

Patent Document

Patent Document 1: Japanese Patent Application Laid-Open No. 2012-127922
Patent Document 2: Japanese Patent Application Laid-Open No. 2014-36604

SUMMARY OF THE INVENTION

Problems to be Solved by the Invention

In the technology of fractionating the target microparticle in the microchip, for example, the target microparticle may be sucked into the particle fractionating flow path by a negative pressure. In a case where the liquid does not contain the target microparticle, the suction is not performed. Therefore, in order to improve a fractionation performance of the microparticle, it is necessary to optimize a timing of the suction and/or magnitude of a suction force applied.

An object of the present technology is to optimize the timing of the suction and/or the magnitude of the suction force applied in order to improve the fractionation performance of the microparticle in the technology of fractionating the target microparticle.

Solutions to Problems

The inventors found that the above-described problem may be solved by a specific method.

In other words, the present technology provides
an optimizing method of a suction condition of a microparticle including:
a particle number counting step of
detecting a time point when a microparticle passes through a predetermined position on a main flow path through which liquid containing the microparticle flows,
sucking the microparticle from the main flow path to a microparticle suction flow path by the microparticle suction flow path with a predetermined suction force, and
counting the number of microparticles sucked into the microparticle suction flow path; and a step of determining an elapsed time from passage through the predetermined position with which the suction by the microparticle suction flow path should be performed on the basis of a time from the time point when the microparticle passes through the predetermined position on the main flow path until the suction is performed and the number of counted microparticles.

In one implementation of the present technology, the method may further include: a repeating step of repeating the particle number counting step while changing the time from the time point when the microparticle passes through the predetermined position on the main flow path until the suction is performed.

In one implementation of the present technology, the method may further include a second repeating step of repeating the particle number counting step and the repeating step while changing the suction force.

In one implementation of the present technology, at the second repeating step, the suction force is decreased step-wise at a predetermined rate, and the second repeating step may be performed until a result in which the number of microparticles sucked into the microparticle suction flow path is 0 in every case of elapsed time is obtained.

In one implementation of the present technology, at the determining step, the suction force obtained by increasing at a predetermined rate from the suction force in a case where the result in which the number is 0 in every case of elapsed time is obtained may be determined as the suction force which should be applied to the suction of the microparticles.

In one implementation of the present technology, at the particle number counting step, the number of microparticles may be counted in a predetermined position in the microparticle suction flow path.

In one implementation of the present technology, at the particle number counting step, the number of microparticles may be counted by detecting passage through a predetermined position in the microparticle suction flow path.

In one implementation of the present technology, at the determining step, a success rate of the suction to the microparticle suction flow path of the microparticles is calculated on the basis of the number of microparticles counted at the particle number counting step and the repeating step, and an elapsed time from the passage through the predetermined position with which the suction by the microparticle suction flow path should be performed may be determined on the basis of the success rate.

In one implementation of the present technology, the optimizing method may be performed for optimizing a suction condition of the microparticle in a microchip including the main flow path through which the liquid containing the microparticle flows, the microparticle suction flow path coaxial with the main flow path, and a branch flow path branching from the main flow path.

Furthermore, the present technology also provides a microparticle fractionating device including:
a control unit which executes
a particle number counting step of
detecting a time point when a microparticle passes through a predetermined position on a main flow path through which liquid containing the microparticle flows,
sucking the microparticle from the main flow path to a microparticle suction flow path by the microparticle suction flow path with a predetermined suction force, and
counting the number of microparticles sucked into the microparticle suction flow path; and a determining unit which determines an elapsed time from passage through the predetermined position with which the suction by the microparticle suction flow path should be performed
on the basis of a time from the time point when the microparticle passes through the predetermined position on the main flow path until the suction is performed and the number of counted microparticles.

Effects of the Invention

According to the present technology, in a technology of fractionating a target microparticle, a timing at which suction is performed and/or magnitude of a suction force applied is optimized. As a result, a fractionation performance of the microparticle is improved.

Note that, the effects of the present technology are not necessarily limited to the effects herein described and may be any of the effects described in the present technology.

MODE FOR CARRYING OUT THE INVENTION

Hereinafter, a preferred mode for carrying out the present technology is described. Note that, embodiments hereinafter described are representative embodiments of the present technology, and the scope of the present technology is not narrowed by them. Note that, the description is given in the following order.

1. Description of related technology
2. First embodiment (optimizing method of suction condition of microparticle)

3. Second embodiment (optimizing method of suction condition of microparticle)

4. Third embodiment (microparticle fractionating device)

1. Description of Related Technology

Figure 1:
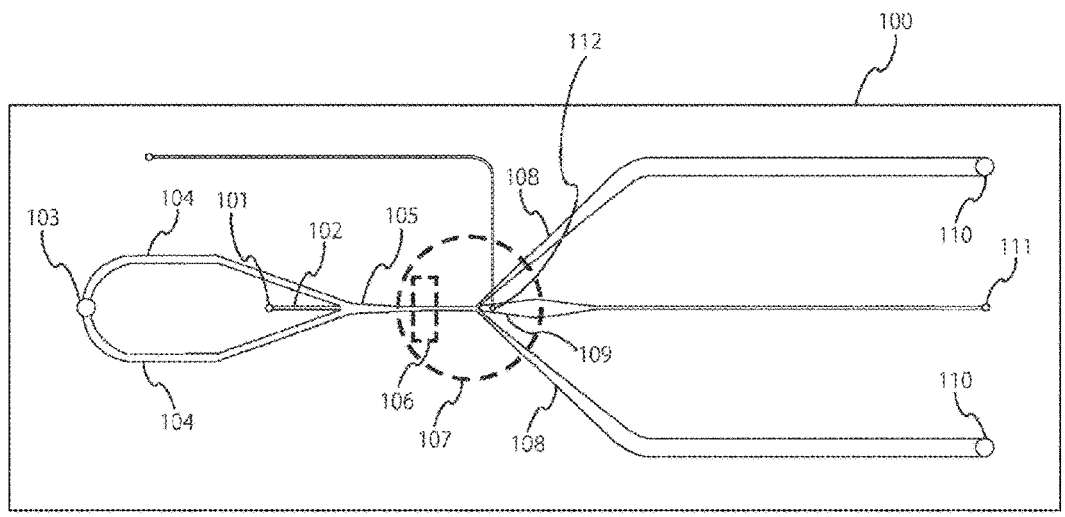
FIG. 1 is a schematic diagram of a microchip used in a microparticle fractionating technology.

A technology of fractionating a target microparticle is described below with reference to FIG. 1. FIG. 1 is a schematic diagram of an example of a microchip for fractionating the microparticle.

As illustrated in FIG. 1, a microchip 100 is provided with a sample liquid inlet 101 and a sheath liquid inlet 103. Sample liquid and sheath liquid are introduced into a sample liquid flow path 102 and a sheath liquid flow path 104 from these inlets, respectively. The sample liquid contains the microparticle.

The sheath liquid flowing through the sheath liquid introduction flow path 104 joins with the sample liquid flowing through the sample liquid flow path 102 to form a laminar flow in which the sample liquid is surrounded by the sheath liquid. The laminar flow flows through a main flow path 105 toward a fractionating portion 107.

In the fractionating portion 107, the laminar flow which flows through the main flow path 105 flows to a branch flow path 108. Furthermore, in a branch portion 107, only in a case where a particle which should be recovered flows, a flow to a particle fractionating flow path 109 is formed and the particle is recovered. When the particle is sucked into the particle fractionating flow path 109, the sample liquid forming the laminar flow or the sample liquid and the sheath liquid forming the laminar flow might also flow to the particle fractionating flow path.

A gate flow inlet 112 may also be provided to prevent a particle which should not be recovered from entering the particle fractionating flow path 109. The sheath liquid is introduced from the gate flow inlet 112 and a flow in a direction from the particle fractionating flow path 109 to the main flow path 105 is formed, so that the particle which should not be recovered is prevented from entering the particle fractionating flow path 109.

In this manner, the microparticle is fractionated by the fractionating portion 107.

The fractionating portion 107 includes a detection area 106. In the detection area 106, the microparticle flowing through the main flow path 105 is irradiated with light, and it may be determined whether the microparticle should be recovered or not by scattered light and/or fluorescence resulting from the irradiation.

Figure 2:
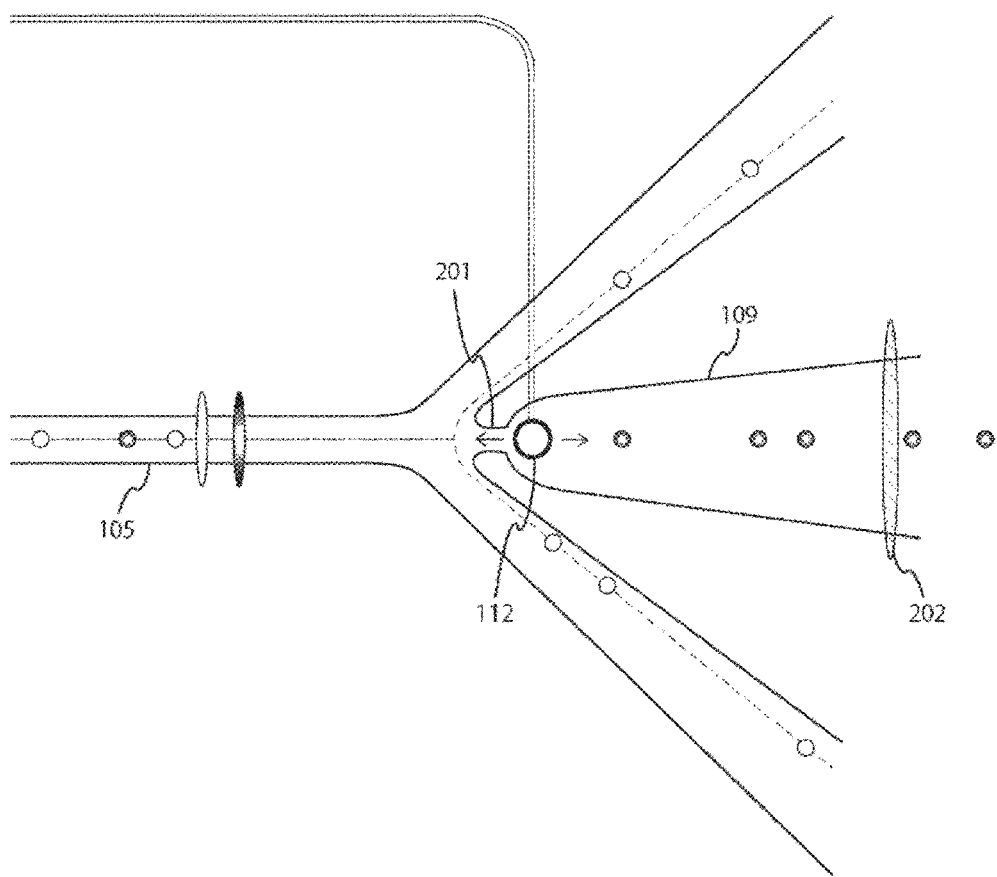
FIG. 2 is an enlarged view of a fractionating portion of the microchip.

An enlarged view of the fractionating portion 107 is illustrated in FIG. 2. As illustrated in FIG. 2, the main flow path 105 and the particle fractionating flow path 109 are communicated with each other through an orifice 201 coaxial with the main flow path 105. The particle which should be recovered flows through the orifice 201 to the particle fractionating flow path 109. Furthermore, the gate flow inlet 112 is provided in the vicinity of the orifice 201 in order to prevent the particle which should not be recovered from entering the particle fractionating flow path 109 through the orifice 201. Note that the gate flow inlet 112 may also be provided in the orifice 201. The sheath liquid is introduced from the gate flow inlet 112 and a flow in a direction from the orifice 201 to the main flow path 105 is formed, so that the particle which should not be recovered is prevented from entering the particle fractionating flow path 109. A pressure chamber may also be communicated with the particle fractionating flow path 109. The pressure chamber may also be provided on the particle fractionating flow path 109 or the particle fractionating flow path itself may serve as the pressure chamber. A pressure in the pressure chamber may be decreased or increased. By decreasing the pressure in the pressure chamber, the microparticle is introduced into the particle fractionating flow path 109, or by increasing or maintaining the pressure in the pressure chamber, the microparticle is prevented from entering the particle fractionating flow path 109. In this manner, it becomes possible to fractionate only the particle which should be recovered by adjusting the pressure in the pressure chamber.

In the microchip having such a flow path structure, in a case where the particle is recovered, a flow that goes from the main flow path 105 through the orifice 201 to the particle fractionating flow path 109 (hereinafter, also referred to as a "flow at the time of particle recovery") is formed. The flow is not formed except in a case where the particle is recovered. The pressure in the pressure chamber may be decreased to form the flow at the time of particle recovery. Due to the decrease in pressure, a flow stronger than the flow from the orifice to the main flow path caused by the gate flow is formed from the main flow path 105 toward the particle fractionating flow path 109, and as a result, the target particle may be fractionated into the particle fractionating flow path 109.

The flow at the time of particle recovery may be formed by making the pressure in the particle fractionating flow path 109 a negative pressure. In other words, the particle is sucked into the particle fractionating flow path 109 by making the pressure in the particle fractionating flow path 109 the negative pressure. The particle is sucked at a time point when a predetermined time elapses from when the particle passes through the detection area 106 in a case where it is determined that the particle should be recovered on the basis of light detected in the detection area 106. In order to fractionate the particle more accurately, it is necessary to optimize a time elapsed before the time point when the suction should be performed.

As a method of adjusting the time when the suction should be performed, for example, it is conceivable to take a moving image of a situation in which the particle is fractionated by using a high-speed camera or the like to adjust the time when the suction should be performed on the basis of the moving image. However, this method is not desirable because this requires an expensive high-speed camera and software for performing the method. Therefore, it is required to develop a new method of determining the time point when the suction should be performed.

Furthermore, in a case where the adjustment is performed manually, a worker's man-hour is increased. Therefore, in order to decrease the worker's man-hour, it is desirable that the adjustment be performed automatically.

Furthermore, in a case where the particle is sucked into the particle fractionating flow path 109, the sample liquid and/or the sheath liquid is sucked into the particle fractionating flow path 109 together with the particle. In a case where an applied suction force is too large, an amount of the sample liquid and/or the sheath liquid sucked into the particle fractionating flow path 109 together with the particle increases and density of the recovered particles decreases, so that this is not desirable. On the other hand, in a case where the applied suction force is too small, possibility that the particle is not recovered increases. Therefore, it is desirable to optimize the applied suction force, too.

As an optimizing method of the suction force also, it is conceivable to take a moving image of the situation in which the particle is fractionated by using the above-described high-speed camera to adjust the suction force on the basis of the moving image. However, for the above-described reason, this method is not desirable, too. Therefore, there is a need for developing a new method of optimizing the suction force.

Furthermore, in the technology of fractionating the target microparticle in the microchip, the microchip may be mounted on a microparticle fractionating device to be used. In the microparticle fractionating device, the microchip may be replaced for every experiment or for every sample which should be analyzed. By replacing the microchip, contamination between samples may be avoided. However, replacing the microchip might cause a change in position irradiated with the light in the detection area 106, in length of the flow path, and/or the like. Therefore, in a case where the microchip is newly mounted, it is necessary to optimize the time point when the microparticle should be sucked and/or the suction force which should be applied for fractionating the particle more accurately. Furthermore, it is desirable that such optimization be performed automatically.

As described above, there is a need for a new method of optimizing a parameter related to the suction in the technology of fractionating the target microparticle. The present technology provides a new method of optimizing the parameter related to the suction.

2. First Embodiment (Optimizing Method of Suction Condition of Microparticle)

The present technology provides an optimizing method of a suction condition of a microparticle. The method includes a particle number counting step of detecting a time point when a microparticle passes through a predetermined position on a main flow path through which liquid containing a microparticle flows, sucking the microparticle from the main flow path to a microparticle suction flow path by the microparticle suction flow path with a predetermined suction force, and counting the number of microparticles sucked into the microparticle suction flow path, and a step of determining an elapsed time from passage through the predetermined position with which the suction by the microparticle suction flow path should be performed on the basis of a time from the time point when the microparticle passes through the predetermined position on the main flow path until the suction is performed and the number of counted microparticles.

The method may be performed, for example, for optimizing a suction condition of the microparticle in a microchip including the main flow path through which the liquid containing the microparticle flows, the microparticle suction flow path coaxial with the main flow path, and a branch flow path branching from the main flow path. Examples of the microchip include, but are not limited to, the microchip described in above-described "1. Description of related technology", for example.

Figure 3:
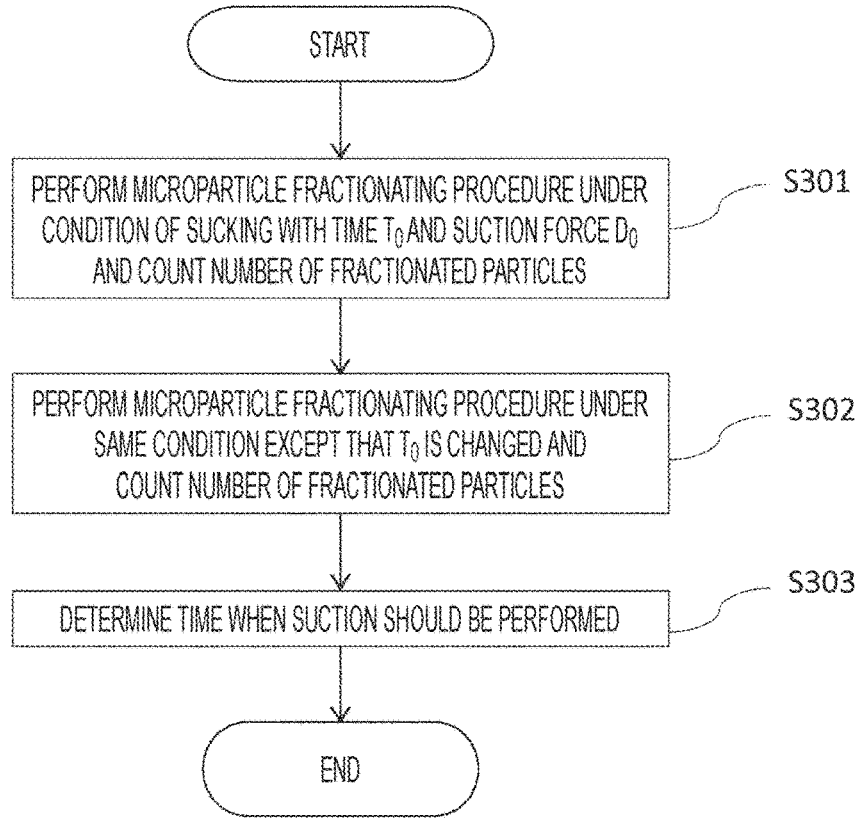
FIG. 3 is a flowchart of a suction condition optimizing method of the present technology.

An example of an implementation of the above-described method is hereinafter described with reference to FIG. 3. FIG. 3 illustrates a flowchart of an optimizing method of the suction condition according to the implementation of the present technology.

(1) Particle Number Counting Step S301

At a particle number counting step S301 in FIG. 3, a microparticle fractionating procedure is executed in the microchip under a condition of performing the suction by the microparticle suction flow path with a predetermined suction force $D_0$ at a time point when a predetermined time $T_0$ elapses after the microparticle passes through the predetermined position on the main flow path, and the number of microparticles sucked into the microparticle suction flow path as a result of executing the fractionating procedure is counted.

At the particle number counting step S301, the time point when the microparticle passes through the predetermined position on the main flow path through which the liquid containing the microparticle flows may be detected. It is sufficient that the predetermined position on the main flow path is a position in which the passage of the microparticle may be detected. The predetermined position may be, for example, in the detection area on the main flow path, and may be, for example, a light irradiation position.

Figure 4:
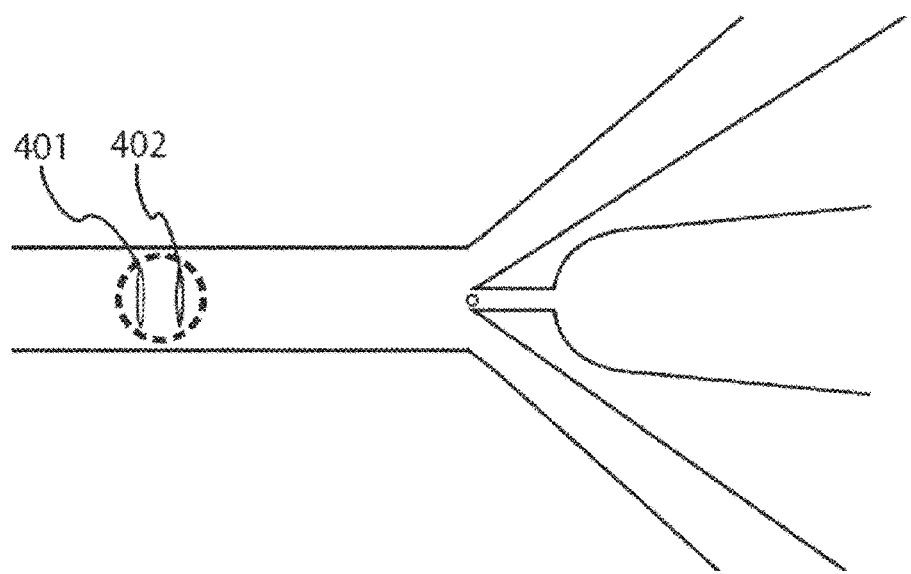
FIG. 4 is a view illustrating a position for detecting passage of the microparticle.

The predetermined position on the main flow path is described with reference to FIG. 4. FIG. 4 is an enlarged view of the fractionating portion 107. As illustrated in FIG. 4, for example, two lights 401 and 402 may be applied perpendicularly to a travel direction of the particle in the detection area. An irradiation interval of the two lights 401 and 402 may be, for example, 20 to 200 µm, preferably 30 to 150 µm, and more preferably 40 to 120 µm. Wavelengths of the two lights may be different or may be the same. The predetermined position may be, for example, an irradiation position of the light 402 on a side of the microparticle suction flow path among the two lights or an irradiation position of the other light 401. When the microparticle passes through a portion irradiated with the light, the passage of the microparticle may be detected by generation of scattered light and/or fluorescence.

At the particle number counting step S301, the microparticle is sucked from the main flow path into the microparticle suction flow path with the predetermined suction force by the microparticle suction flow path. The suction may be performed when the predetermined time $T_0$ elapses after the passage through the predetermined position. The predetermined time $T_0$ after the passage through the predetermined position may be appropriately set by one skilled in the art, and may be determined in consideration of, for example, a size of the microchip, particularly a distance from the light irradiation area on the main flow path of the microchip to an entrance of the orifice and/or a flow speed of the particle. The distance may be a distance from the light irradiation position on the side of the microparticle suction flow path out of the two lights to the entrance of the orifice, for example. The distance may be, for example, 300 to 1500 µm, preferably 400 to 1200 µm, and more preferably 500 to 1000 µm.

For example, the time $T_0$ may be a time from the time point of the passage through the predetermined position to a time point of arrival to any position in an area where the microparticles is sucked into the microparticle suction flow path in a case where the suction is performed with the suction force $D_0$. Alternatively, this may also be a time from the time point of the passage through the predetermined position to the time point before the arrival to the area.

Figure 5:
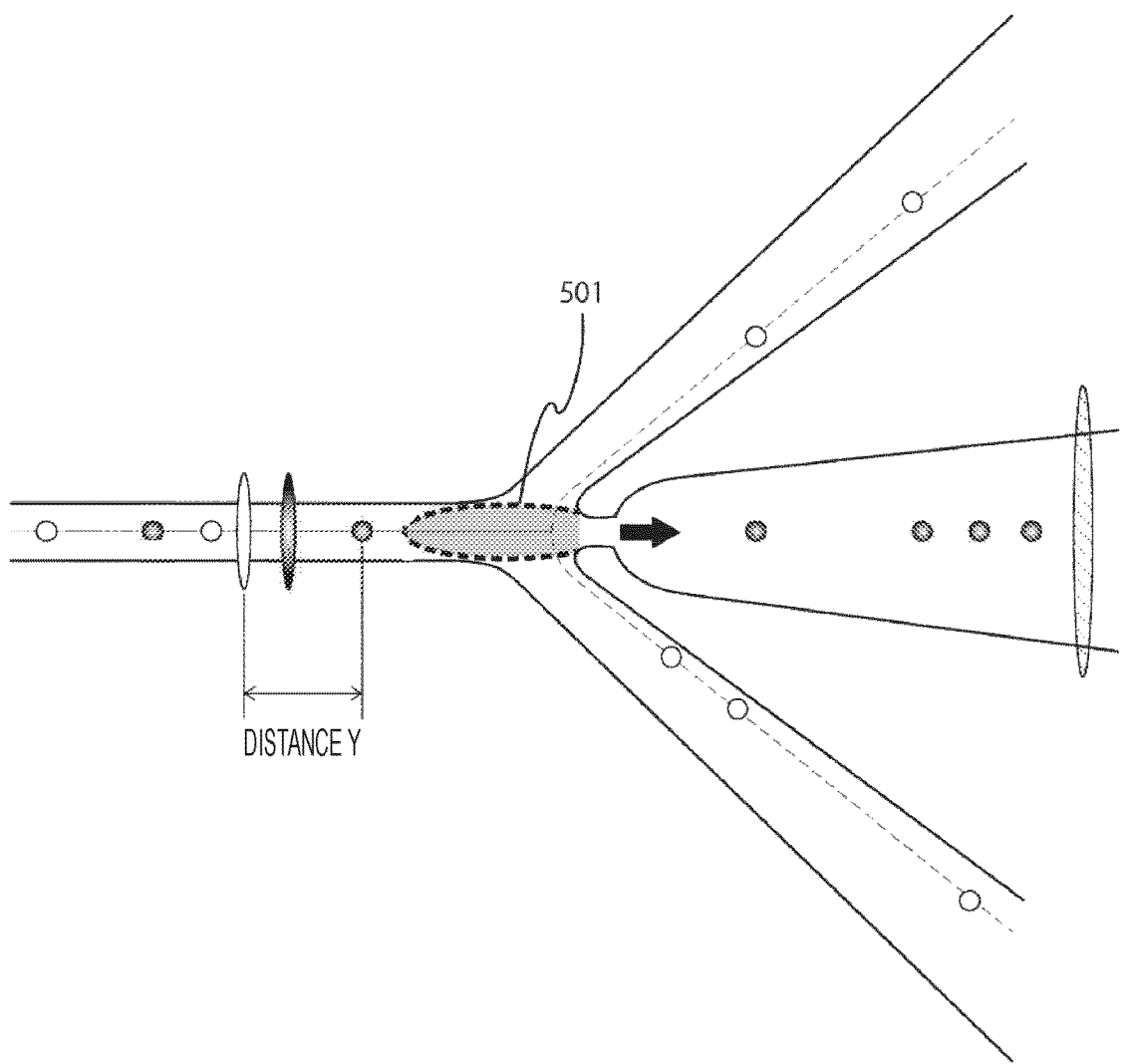
FIG. 5 is a view illustrating an area where the microparticle is sucked into a microparticle suction flow path in a case where suction is performed under a predetermined condition.

The time $T_0$ is further described with reference to FIG. 5. FIG. 5 is an enlarged view of a fractionating portion 107. In FIG. 5, an area 501 expanding in an elliptical shape from the entrance of the microparticle suction flow path toward the irradiation area is an area where the microparticle is sucked into the microparticle suction flow path in a case of the suction with the suction force $D_0$. In FIG. 5, a particle is present in a position after a travel by a distance Y from the light irradiation position. The particle does not reach the area yet. A time from the time point of the passage through the light irradiation position to a time point when the particle travels the distance Y may be adopted as the time $T_0$.

Alternatively, as time passes further, the particle reaches the area. A time from the time point of the passage through the light irradiation position to a time point when the particle reaches any position in this area may be adopted as the time $T_0$.

When setting the time $T_0$, the speed in the flow path of the particle may be taken into consideration as required. The speed may be appropriately measured by a method known to one skilled in the art. For example, as illustrated in FIG. 4 above, in a case where the two light irradiation positions 401 and 402 are provided, the speed in the flow path of the particle may be calculated on the basis of a distance between the two irradiation positions and a time required for passage between the two irradiation positions. By such a calculating method, the speed of the particle may be calculated more accurately. Furthermore, by accurately calculating the particle speed, the suction condition may be optimized better.

Furthermore, a distance from the predetermined position may be calculated from the speed and the elapsed time. In another implementation of the present technology, instead of the time T, the distance Y from the predetermined position may be used as a variable. In other words, in another implementation of the present technology, at the particle number counting step, the microparticle fractionating procedure is executed in the microchip under a condition of performing the suction by the microparticle suction flow path with the predetermined suction force $D_0$ when the microparticle travels from the predetermined position on the main flow path toward the microparticle suction flow path by a predetermined distance $Y_0$, and the number of microparticles sucked into the microparticle suction flow path as a result of executing the fractionating procedure is counted. In this implementation, the distance from the predetermined position with which the suction by the microparticle suction flow path should be performed is determined. In other words, in the present technology, instead of the timing at which the suction should be performed, the distance from the predetermined position with which the suction should be performed may be optimized. The optimization of the distance may also be performed in following second and third embodiments. In other words, in the second and third embodiments, instead of the time T, the distance Y from the predetermined position may be used as the variable.

The suction by the microparticle suction flow path with the predetermined suction force $D_0$ may be performed, for example, by making the pressure in the microparticle suction flow path the negative pressure. The negative pressure may be applied by, for example, a piezo element. Since there is a predetermined relationship between the suction force $D_0$ and a drive voltage of the piezo element, the suction force $D_0$ may be adjusted by adjusting the drive voltage of the piezo element. Adjustment of the drive voltage of the piezo element may be performed by means known to one skilled in the art.

At the particle number counting step S301, the microparticle fractionating procedure may be executed, for example, by using a microparticle fractionating device equipped with the microchip described in above-described 1. A configuration of the microparticle fractionating device is described in detail in following 4, so that please refer to the same. In the microparticle fractionating procedure, sample liquid containing the known number of microparticles may be used. The number of microparticles may be appropriately set by one skilled in the art, and may be, for example, 10 to 1000, particularly 30 to 500, and more particularly 50 to 300. In the microparticle fractionating procedure, the sample liquid containing the known number of microparticles is introduced from a sample liquid inlet 101 then travels through a sample liquid flow path 102, and sheath liquid is introduced from a sheath liquid inlet 103 then travels through a sheath liquid flow path 104. The sample liquid and the sheath liquid join to form a laminar flow, then the laminar flow flows through a main flow path 105 toward the fractionating portion 107. Light is applied to the laminar flow in a detection area 106. When the microparticle passes through the detection area, the scattered light and/or fluorescence is generated from the microparticle. Only in a case where the scattered light and/or the fluorescence is detected, the suction with the suction force $D_0$ is performed at the time point when the predetermined time $T_0$ elapses from when the microparticle passes through the predetermined position. For example, in the microparticle fractionating procedure using the sample liquid containing 100 microparticles, the suction may be performed for each microparticle, that is, the suction may be performed 100 times.

At the particle number counting step S301, the number of microparticles sucked into the microparticle suction flow path is counted. For example, at the particle number counting step S301, the number of microparticles sucked into the microparticle suction flow path as a result of performing the microparticle procedure on the known number of microparticles is counted. The counting may be performed by means known to one skilled in the art, or may be performed in the detection area provided in the microparticle suction flow path. The counting of the number of microparticles may be performed in a predetermined position in the microparticle suction flow path. For example, the number of microparticles may be counted by detecting passage through the predetermined position in the microparticle suction flow path. An example of a detection area provided in the microparticle suction flow path is, for example, a light irradiation area 202 illustrated in FIG. 2. As illustrated in FIG. 2, when the microparticle passes through the light irradiation area 202 provided in the microparticle suction flow path, scattered light and/or fluorescence is emitted from the microparticle. By detecting the scattered light and/or the fluorescence, the number of microparticles sucked into the microparticle suction flow path may be counted.

In the present technology, the microparticle may be appropriately selected by one skilled in the art. In the present technology, the microparticles may include biological microparticles such as cells, microorganisms, and liposomes, synthetic particles such as latex particles, gel particles, and industrial particles and the like. In the method of the present technology, the synthetic particles may be preferably used and beads for optimizing the suction condition may be particularly preferably used as the microparticles. The synthetic particles are more easily available than the biological microparticles, so that they are more preferred for the method of the present technology.

The biological microparticles may include chromosomes forming various cells, liposomes, mitochondria, organelles (cell organelles) and the like. The cells may include animal cells (such as blood cells) and plant cells. The microorganisms may include bacteria such as *Escherichia coli*, viruses such as tobacco mosaic virus, fungi such as yeast and the like. Moreover, the biological microparticles may also include biological polymers such as nucleic acids, proteins, and complexes thereof. Furthermore, the synthetic particles may be particles including, for example, organic or inorganic polymer materials, metal, or the like. The organic polymer material may include polystyrene, styrene/divinylbenzene, polymethyl methacrylate and the like. The inorganic polymer material may include glass, silica, a magnetic material and the like. The metal may include gold colloid, aluminum, and the like. A shape of the microparticle may be spherical or substantial spherical or non-spherical in general. A size and mass of the microparticle may be appropriately selected by one skilled in the art depending on a size of the flow path of the microchip. The size of the flow path of the microchip may be appropriately selected depending on the size and mass of the microparticle. In the present technology, chemical or biological labels such as fluorescent dyes, for example, may be attached to the microparticles as needed. The label may make detection of the microparticles easier. The label which should be attached may be appropriately selected by one skilled in the art.

The microchip used in the method of the present technology may be manufactured by a method known in the art. For example, the microchip used in the method of the present technology may be manufactured, for example, by bonding two substrates on which the flow path as described in above-described 1. is formed. The flow path may be formed on both of the two substrates, or may be formed on only one of the substrates. In order to make adjustment of a position when bonding the substrates easier, the flow path may be formed on only one substrate.

Materials known in the art may be used as the material for forming the microchip used in the present technology. Examples include, but are not limited to, for example, polycarbonate, cycloolefin polymer, polypropylene, polydimethylsiloxane (PDMS), polymethylmethacrylate (PMMA), polyethylene, polystyrene, glass, and silicon. Especially, polymer materials such as polycarbonate, cycloolefin polymer, polypropylene are particularly preferable because they are excellent in processability and may manufacture microchips inexpensively using a molding device.

(2) Step S302 of Repeating Particle Number Counting Step

At a repeating step S302 in FIG. 3, the particle number counting step is repeated while changing the time from the time point when the microparticle passes through the predetermined position on the main flow path until when the suction is performed. For example, the particle number counting step is repeated in the same manner except that the $T_0$ is changed to longer and/or shorter various times $T_n$. The time $T_n$ may be appropriately set by one skilled in the art in consideration of, for example, the size of the microchip, an area covered by the suction force in a case where a predetermined suction force is applied, and/or tolerance. By performing the particle number counting step for each of the various times $T_n$ at the repeating step S302, a particle number counting result may be obtained for each of the various times $T_n$.

For example, the various times $T_n$ may be times obtained by increasing and/or decreasing the $T_0$ stepwise at a predetermined rate. The predetermined rate may be, for example, 0.01% to 5%, particularly 0.05 to 2%, and more particularly 0.1 to 1%. The number of steps of increasing and/or decreasing the $T_0$ may be, for example, 5 to 50 steps, particularly 7 to 40 steps, and more particularly 10 to 30 steps. For example, in a case where the various times $T_n$ are the times obtained by increasing and decreasing the $T_0$ in 20 steps by 0.2%, the various times $T_n$ are $(T_0+T_0\times0.2\%)$, $(T_0+T_0\times0.2\%\times2)$, $(T_0+T_0\times0.2\%\times3)$, ..., and $(T_0+T_0\times0.2\%\times20)$, and $(T_0-T_0\times0.2\%)$, $(T_0-T_0\times0.2\%\times2)$, $(T_0-T_0\times0.2\%\times3)$, ..., $(T_0-T_0\times0.2\%+20)$. In this case, the microparticle fractionating procedure may be performed in each of a total of 51 (1+20+20) elapsed times, including the $T_0$.

Furthermore, the number of steps to increase the $T_0$ and the number of steps to decrease the $T_0$ may be the same or different. Furthermore, the various times $T_n$ may be obtained only by increasing the $T_0$ or decreasing the $T_0$. The number of steps for increasing the $T_0$ and the number of steps for decreasing the $T_0$ may be set appropriately by one skilled in the art. Furthermore, for each of the various times $T_n$, the particle number counting step may be performed a plurality of times, for example, 2 to 5 times, particularly 2 to 3 times.

The particle number counting step performed at the repeating step S302 is the same except that the $T_0$ is changed to various longer and/or shorter times $T_n$. Therefore, as for the description regarding the particle number counting step, please refer to the above-described (1).

(3) Step S303 of Determining Time when Suction Should be Performed

At step S303 of determining time when the suction should be performed in FIG. 3, the elapsed time from the passage through the predetermined position with which the suction by the microparticle suction flow path should be performed is determined on the basis of the number of microparticles counted at the particle number counting step S301 or the particle number counting step S301 and the repeating step S302. As a result, the time point when the suction of the microparticle should be performed is optimized. Furthermore, the determination may be automatically performed by a control unit or the like incorporating a predetermined program.

At the determining step S303, for example, a time T in a case where the number of microparticles counted at the particle number counting step S301 and the repeating step S302 is the largest may be determined as the elapsed time with which the suction should be performed. Alternatively, in a case where there is a plurality of times in a case where the number of microparticles is the largest, any time out of the plurality of times may be determined as the elapsed time with which the suction should be performed, or a central value out of the plurality of times may be determined as the elapsed time with which the suction should be performed.

The elapsed time with which the suction should be performed is hereinafter described in more detail with reference to FIG. 6.

Figure 6:
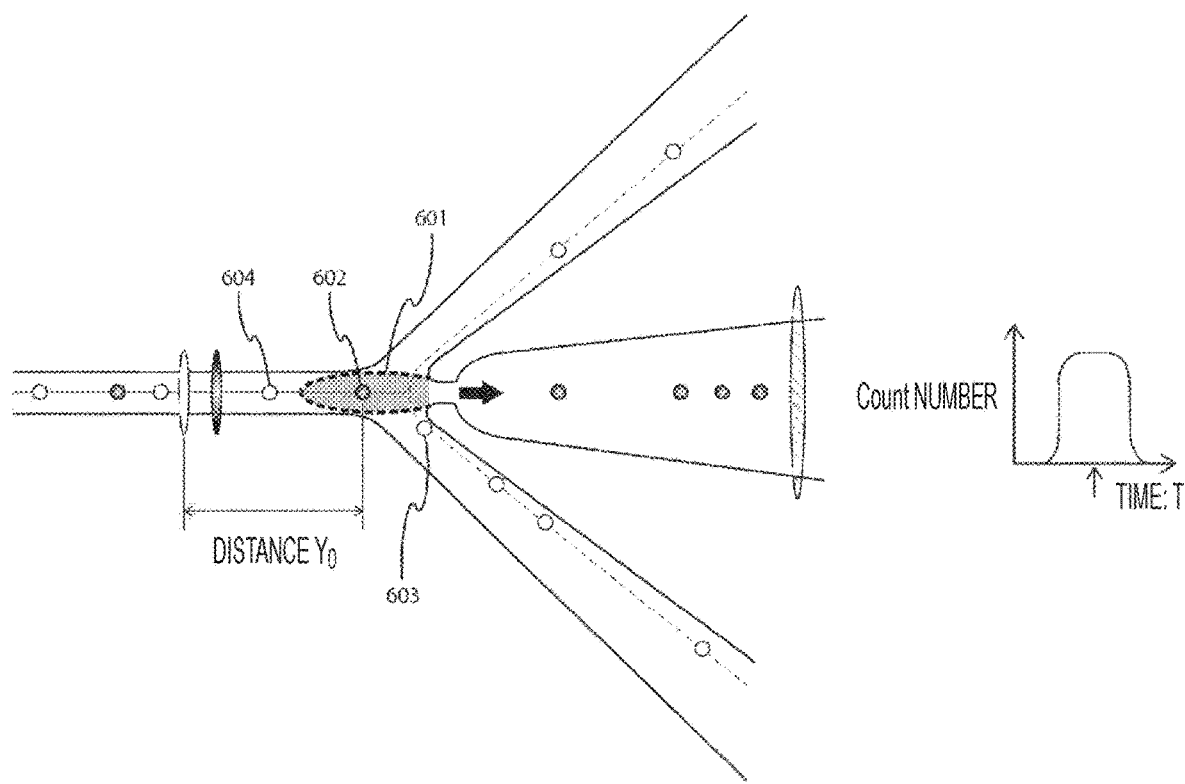
FIG. 6 is a view illustrating an area where the microparticle is sucked into the microparticle suction flow path in a case where the suction is performed under the predetermined condition, and a graph illustrating the number of particles counted under the condition.

FIG. 6 is a schematic diagram illustrating a situation in the flow path in a case of performing the microparticle fractionating procedure under a condition that the suction by the microparticle suction flow path is performed with the predetermined suction force $D_0$ at the time point when the predetermined time $T_0$ elapses from when the microparticle passes through the predetermined position on the main flow path. In FIG. 6, an area 601 expanding in an elliptical shape from the entrance of the microparticle suction flow path toward the irradiation area is an area where the microparticle is sucked into the microparticle suction flow path in a case of the suction with the suction force $D_0$. In FIG. 6, the predetermined position is farther one of the two light irradiation positions from the microparticle suction flow path. A microparticle 602 which passes through the predetermined position travels from the predetermined position by a distance $Y_0$ when the predetermined time $T_0$ elapses and is in a position as illustrated in FIG. 6. In a case of performing the suction by the microparticle suction flow path at the time point when the predetermined time $T_0$ elapses from the passage through the predetermined position with the predetermined suction force $D_0$, the microparticle 602 is in the area 601, so that this is sucked into the microparticle suction flow path.

Note that, as illustrated in FIG. 6, at the time point when the predetermined time $T_0$ elapses after the microparticle passes through the predetermined position, the microparticle is theoretically in the area 601. However, due to factors such as, for example, a condition of the formed laminar flow, a shape of the particle, and/or an actual suction force, there also is a case where this is not sucked into the microparticle suction flow path.

In FIG. 6, in a case where it is sucked with $T_i$ obtained by increasing the time $T_0$, the microparticle is in a position 603, for example. Even when it is sucked with the suction force $D_0$ in a case where this is in the position 603, the microparticle is out of the area 601, so that this is not sucked into the microparticle suction flow path.

Furthermore, in FIG. 6, in a case where it is sucked with $T_j$ obtained by decreasing the time $T_0$, the microparticle is in a position 604, for example. Even when it is sucked with the suction force $D_0$ in a case where this is in the position 604, the microparticle is out of the area 601, so that this is not sucked into the microparticle suction flow path.

Note that, as illustrated in FIG. 6, at a time point when the time $T_i$ or $T_j$ elapses after the microparticle passes through the predetermined position, the microparticle is theoretically out of the area 601. However, due to the factors such as, for example, the condition of the formed laminar flow, the shape of the particle, and/or the actual suction force, there also is a case where this is sucked into the microparticle suction flow path.

A graph in which the $T_0$ is changed to various times and the number of particles counted at each time is plotted against the time is illustrated on a right side of FIG. 6. As illustrated in the graph, the number of counted particles is the largest in a case where the elapsed time is within a predetermined range. Any time within the predetermined range may be determined as the elapsed time with which the suction should be performed, or a central value within the predetermined range may be determined as the elapsed time with which the suction should be performed.

According to one implementation of the present technology, at the determining step, a success rate of the suction to the suction flow path of the microparticles is calculated on the basis of the number of microparticles counted at the particle number counting step and the repeating step, and the elapsed time from the passage through the predetermined position with which the suction by the microparticle suction flow path should be performed may be determined on the basis of the success rate. For example, the elapsed time in a case where the success rate is the highest may be determined as the elapsed time from the passage through the predetermined position with which the suction by the microparticle suction flow path should be performed. Alternatively, any time may be determined as the elapsed time with which the suction should be performed out of a plurality of elapsed times for which the success rate is a predetermined value or larger, or a central value out of the plurality of elapsed times may be determined as the elapsed time with which the suction should be performed.

The present technology optimizes the suction condition of the microparticle. Furthermore, since the method of the present technology may be performed automatically, optimization of the suction condition of the microparticle may be performed automatically. As a result, it is possible to reduce worker's man-hour for microparticle fractionating and time required for a fractionating condition.

Furthermore, in the method of the present technology, by adjusting the steps of the elapsed time increased and/or decreased at the repeating step, the optimization of the suction condition of the microparticle may be performed more accurately.

By optimizing the suction condition of the microparticle by the method of the present technology, it is possible to carry out the fractionation of a sample, for example, a biological sample or the like in the microparticle fractionating device more quickly and more efficiently. For example, purity or density of the fractionated biological sample may be improved.

Moreover, the method according to the present technology eliminates the need for an expensive observation system such as a high-speed camera conventionally used to optimize the suction condition of the microparticle, thereby enabling downsizing of the microparticle fractionating device and/or reduction in manufacturing cost.

Note that these effects may also be achieved by following second and third embodiments.

3. Second Embodiment (Optimizing Method of Suction Condition of Microparticle)

An optimizing method of a suction condition of a microparticle according to the present technology may further include a second repeating step of repeating the particle number counting step and/or the repeating step while changing a suction force. In a case where the optimizing method of the present technology includes the second repeating step, at the determining step, an elapsed time from when a microparticle passes through the predetermined position with which the suction by the microparticle suction flow path should be performed and a suction force which should be applied to the suction of the microparticle may be determined on the basis of the number of microparticles counted at the particle number counting step and/or the repeating step, and the second repeating step.

Figure 7:
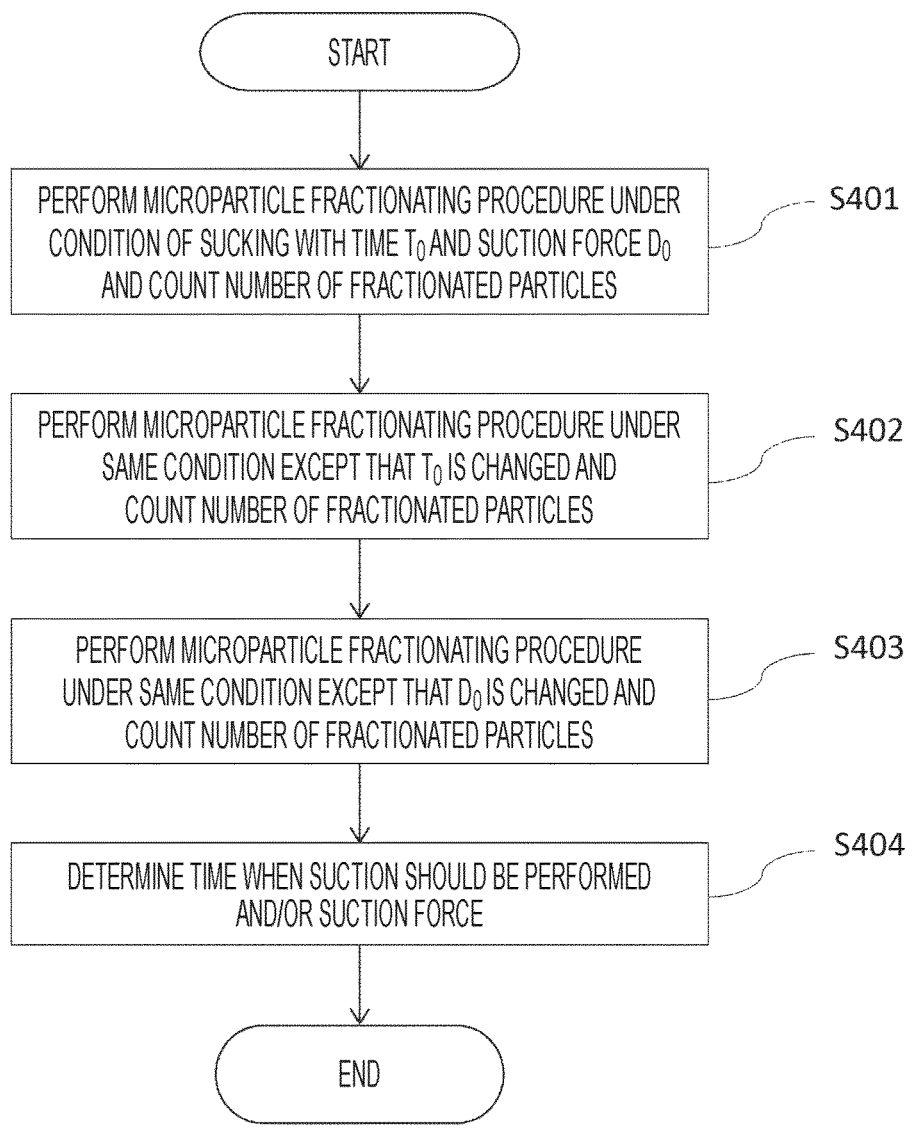
FIG. 7 is a flowchart of the suction condition optimizing method of the present technology.

An example of a flowchart in a case where the optimizing method of the present technology includes the second repeating step is illustrated in FIG. 7. In FIG. 7, steps S401 and S402 are the same as steps S301 and S302 described in above-described 2. Therefore, the description of these steps is omitted.

(1) Second Repeating Step S403 of Repeating Particle Number Counting Step

At a second repeating step S403 in FIG. 7, the particle number counting step and/or the repeating step may be repeated in the same manner except that the suction force $D_0$ is changed to various larger and/or smaller suction forces $D_n$. Preferably, at the second repeating step S403 in FIG. 7, particle number counting step S401 and repeating step S402 may be repeated in the same manner except that the suction force $D_0$ is changed to various smaller suction forces $D_n$. The suction force $D_n$ may be appropriately set by one skilled in the art in consideration of factors such as, for example, a specification of a suction means provided on a microparticle suction flow path, a size of a microchip, an area covered by a suction force in a case where a predetermined suction force is applied, and/or tolerance. By performing the particle number counting step for each of the various suction forces $D_n$ at the repeating step S403, a particle number counting result is obtained for each of the various suction forces $D_n$.

For example, the various suction forces $D_n$ may be the suction forces obtained by increasing or decreasing the $D_0$ stepwise at a predetermined rate. The predetermined rate may be, for example, 0.01% to 30%, particularly 0.1% to 25%, more particularly 1 to 20%, and still more particularly 1 to 10%. The number of steps for increasing or decreasing the $D_0$ may be, for example, 3 to 20 steps, particularly 4 to 15 steps, and more particularly 5 to 10 steps. For example, in a case where the various suction forces $D_n$ are obtained by decreasing the $D_0$ by 20% in four steps, the various suction forces $D_n$ are ($D_0-D_0\times20\%$), ($D_0-D_0\times20\%\times2$), ($D_0-D_0\times20\%\times3$), and ($T_0-T_0\times20\%\times4$). In this case, a microparticle fractionating procedure may be performed with each of a total of five suction forces including the above-described $D_0$.

Furthermore, the number of steps of increasing the $D_0$ and the number of steps of decreasing the $D_0$ may be the same or different. Furthermore, the various suction forces $D_n$ may be obtained only by increasing the $D_0$ or only decreasing the $D_0$. The number of steps to increase the $D_0$ and the number of steps to decrease the $D_0$ may be appropriately set according to a value of the $D_0$. Furthermore, for each of the various suction forces $D_n$, the particle number counting step may be performed a plurality of times, for example, two to five times, particularly two to three times.

The particle number counting step performed at the second repeating step S403 is the same as the steps S301 and S302 described in above-described 2. except that the $D_0$ is changed to a smaller suction force or a larger suction force $D_n$. Therefore, for the description of the particle number counting step, please refer to the above-described 2.(1) and (2).

(2) Step S404 of Determining Time when Suction should be Performed and/or Suction Force which should be Applied At step S404 of determining the time when the suction should to be performed and/or the suction force which should be applied in FIG. 7, the elapsed time from passage through the predetermined position with which the suction by the microparticle suction flow path should be performed and/or the suction force which should be applied to the suction of the microparticle is determined on the basis of the number of microparticles counted at the particle number counting step S401, the repeating step S402, and the second repeating step S403. As a result, the time point when the suction of the microparticle should be performed and the suction force which should be applied are optimized. Furthermore, the determination may be automatically performed by, for example, a control unit incorporating a predetermined program and the like.

At the determining step S404, for example, a time T and a suction force D in a case where the number of microparticles counted at the particle number counting step S401, the repeating step S402, and the second repeating step S403 is the largest and the suction force is the smallest may be determined as the elapsed time with which the suction should be performed and the suction force which should be applied.

Alternatively, it is also possible that the suction force D which is the smallest is determined as the suction force which should be applied from combinations of a time $T_n$ and a suction force $D_n$ in a case where a predetermined number or more of microparticles are counted, and a central value among a plurality of elapsed times with which the predetermined number or more of the microparticles are counted with the determined suction force may be determined as the elapsed time with which the suction should be performed.

Alternatively, in a case where there are two or more combinations of time and suction force with which a predetermined number or more of microparticles are counted and the suction force is the smallest, any combination of time and suction force from the combinations may be determined as the elapsed time with which the suction should be performed and the suction force which should be applied. Alternatively, in a case where there are two or more combinations of time and suction force with which a predetermined number or more of microparticles are counted and the suction force is the smallest, the smallest value of the suction force may be determined as the suction force which should be applied and a central value of the plurality of times may be determined as the elapsed time with which the suction should be performed.

The elapsed time with which the suction should be performed and the suction force which should be applied are hereinafter described in further detail with reference to FIGS. 6 and 8.

FIG. 6 is a schematic diagram illustrating a situation in a flow path in a case of performing the microparticle fractionating procedure as described above. As described above, in a case of performing the suction by the microparticle suction flow path at the time point when the predetermined time $T_0$ elapses from the passage through the predetermined position with the predetermined suction force $D_0$, a microparticle 602 is in an area 601, so that this is sucked into the microparticle suction flow path.

Figure 8:
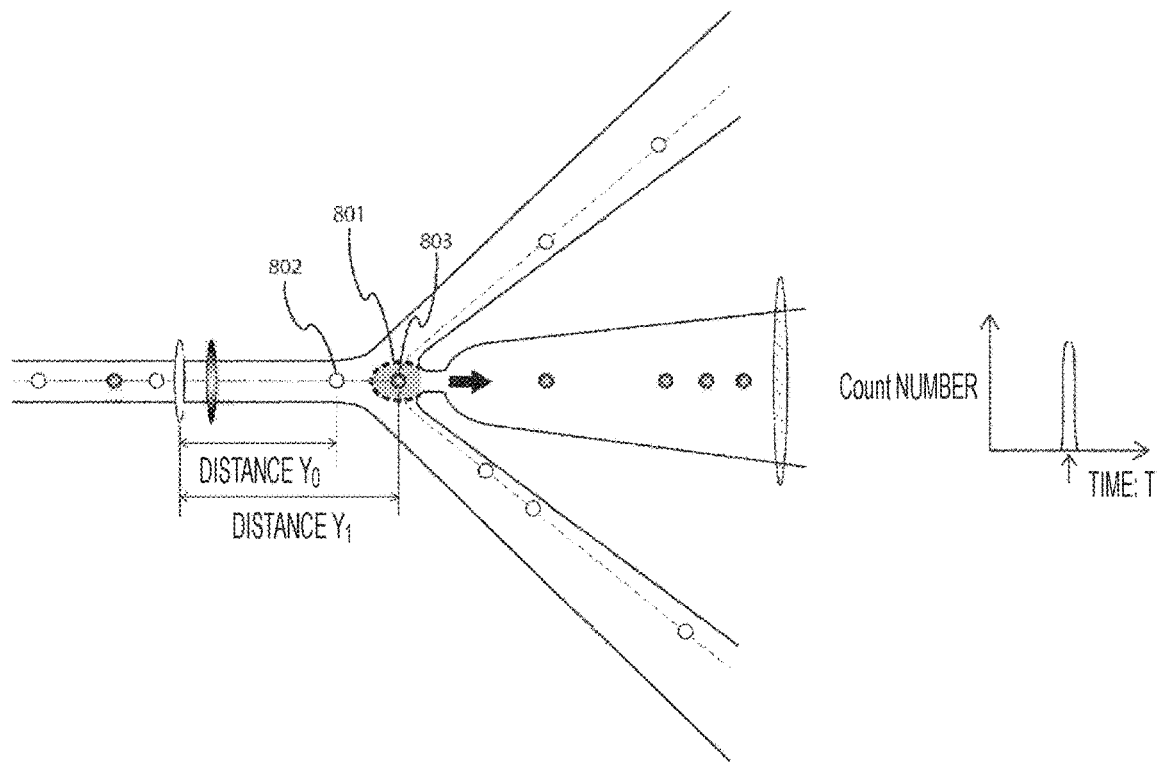
FIG. 8 is a view illustrating an area where the microparticle is sucked into the microparticle suction flow path in a case where the suction is performed under the predetermined condition, and a graph illustrating the number of particles counted under the condition.

FIG. 8 is a schematic diagram illustrating a situation in the flow path in a case of performing the microparticle fractionating procedure under a condition that the suction by the microparticle suction flow path is performed with the suction force $D_n$ smaller than the suction force $D_0$ at the time point when the predetermined time $T_0$ or $T_1$ elapses from when the microparticle passes through the predetermined position on the main flow path. In FIG. 8, an area 801 expanding in an elliptical shape from an entrance of the microparticle suction flow path toward an irradiation area is an area where the microparticle is sucked into the microparticle suction flow path at the time of suction with the suction force $D_n$. In FIG. 8, the predetermined position is farther one from the microparticle suction flow path of two light irradiation positions.

A microparticle 802 which passes through the predetermined position travels a distance $Y_0$ from the predetermined position when the predetermined time $T_0$ elapses and is in the position as illustrated in FIG. 8. In a case where the suction is performed with the suction force $D_0$ as illustrated in FIG. 6 at the time point when the microparticle 802 is in this position, the microparticle 802 is in the area 601, so that this is sucked into the microparticle suction flow path. However, in a case where the suction is performed with the suction force $D_n$ as illustrated in FIG. 8 at the time point when the microparticle 802 is in this position, the microparticle 802 is out of the area 801, so that this is not sucked into the microparticle suction flow path.

Furthermore, a microparticle 803 which passes through the predetermined position travels a distance $Y_1$ from the predetermined position when a predetermined time $T_1$ elapses and is in the position as illustrated in FIG. 8. In a case of performing the suction by the microparticle suction flow path with the predetermined suction force $D_n$ at the time point when the predetermined time $T_1$ elapses from the passage through the predetermined position, the microparticle 803 is in the area 801, so that this is sucked into the microparticle suction flow path.

As described above, the smaller the suction force, the narrower the area covered by the suction force.

A graph in which the $T_0$ is changed to various times and the number of particles counted at each time is plotted against the time is illustrated on a right side of FIG. 8. As illustrated in the graph, a range of the time T in which the count number is high is narrower than the range in the graph illustrated on the right side of FIG. 6. In this manner, the smaller the suction force, the narrower the range of the time T in which the count number is high. By adopting the elapsed time with which the suction should be performed from the narrowed range of the time T and by adopting a smaller suction force as the suction force which should be applied, the elapsed time with which the microparticle should be sucked and the suction force which should be applied may be optimized.

According to one implementation of the present technology, at the determining step, a success rate of the suction to the suction flow path of the microparticles is calculated on the basis of the number of microparticles counted at the particle number counting step, the repeating step, and the second repeating step, and the elapsed time from the passage through the predetermined position with which the suction by the microparticle suction flow path should be performed and/or the suction force which should be applied may be determined on the basis of the success rate.

For example, the time T and the suction force D in a case where the success rate is the highest and the suction force is the smallest may be determined as the elapsed time with which the suction should be performed and the suction force which should be applied.

Alternatively, from combinations of the time Tn and the suction force Dn in a case of the success rate equal to or higher than a predetermined rate, the time T and the suction force D with which the suction force is the smallest may be determined as the elapsed time with which the suction should be performed and the suction force which should be applied.

Alternatively, in a case where there are two or more combinations of the time and suction force with which a predetermined or larger success rate is achieved and the suction force is the smallest, any combination of the time and suction force out of the combinations may be determined as the elapsed time with which the suction should be performed and the suction force which should be applied. Alternatively, in a case where there are two or more combinations of the time and suction force with which a predetermined or larger success rate is achieved and the suction force is the smallest, the smallest suction force may be determined as the suction force which should be applied and a central value of the plurality of times may be determined as the elapsed time with which the suction should be performed.

(3) Preferred Implementation of Second Repeating Step S404

According to a preferred implementation, at the second repeating step S404, the suction force is decreased stepwise at a predetermined rate from the suction force $D_0$, and the second repeating step may be performed until a result in which the number of microparticles sucked into the microparticle suction flow path is 0 in every case of elapsed time is obtained. In this case, at the determining step, the suction force obtained by increasing at a predetermined rate from the suction force in a case where the result in which the number is 0 in every case of elapsed time is obtained may be determined as the suction force which should be applied to the suction of the microparticle. As a result, the optimization of the suction force may be performed automatically.

A change in situation in the flow path in a case where the suction force is decreased from the suction force $D_0$ is as described above with reference to FIGS. 6 and 8. The predetermined rate and the number of steps for decreasing are as described in above-described (1).

Figure 9:
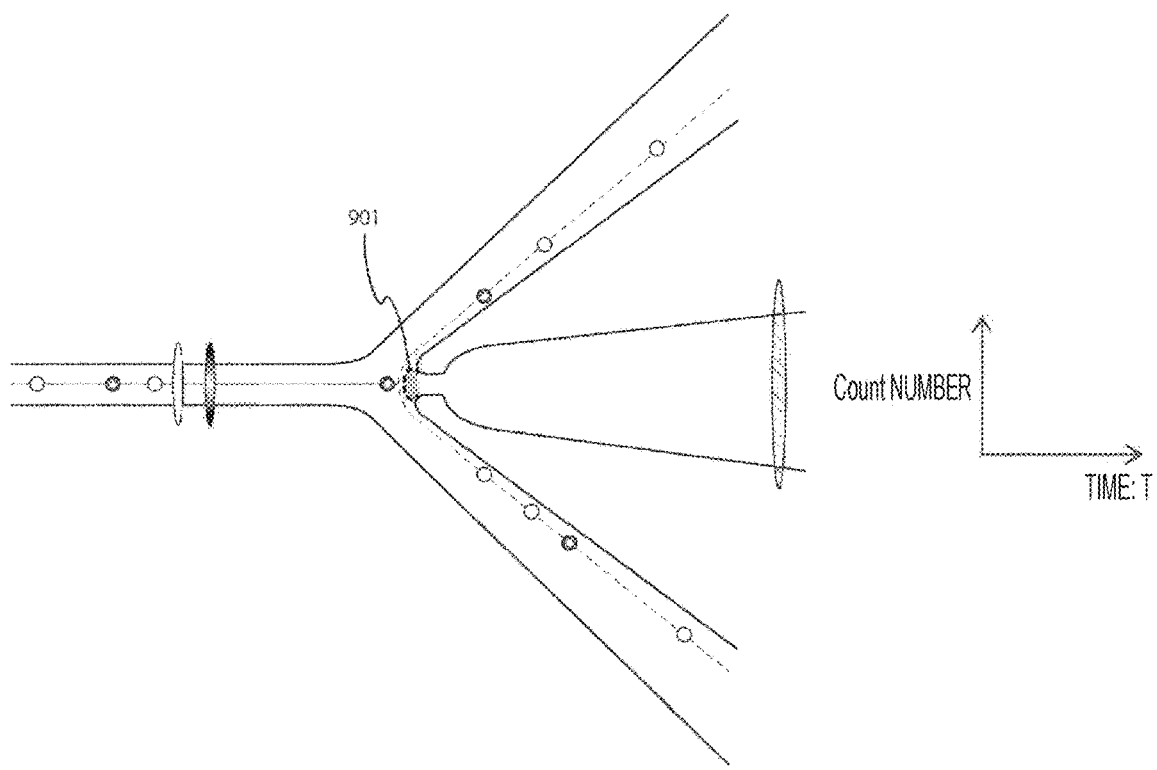
FIG. 9 is a view illustrating an area where the microparticle is sucked into the microparticle suction flow path in a case where the suction is performed under the predetermined condition, and a graph illustrating the number of particles counted under the condition.

The situation in the flow path in a case where the result in which the number of microparticles sucked into the microparticle suction flow path is 0 in every case of elapsed time is obtained is described below with reference to FIG. 9. In FIG. 9, a solid line and a dotted line in the flow path indicate positions through which the microparticle passes. In FIG. 9, an area 901 slightly expanding from the entrance of the microparticle suction flow path toward the irradiation area is an area where the microparticle is sucked into the microparticle suction flow path in a case where it is sucked with a suction force $D_z$ smaller than the suction force $D_1$. As illustrated in FIG. 9, the area 901 does not overlap with either the solid line or the dotted line indicating the position through which the microparticle passes. Therefore, the microparticle is not sucked even if the suction is performed in any case of elapsed time. A graph in which the $T_0$ is changed to various times and the number of particles counted at each time is plotted against the time is illustrated on a right side of FIG. 9. As illustrated in the graph, the count number is 0 regardless of the elapsed time with which the suction is performed.

In the above-described preferred implementation, the second repeating step may be performed until the result in which the number of microparticles sucked into the microparticle suction flow path is 0 in every case of elapsed time is obtained. In other words, the second repeating step may be finished in a case where the result in which the number of microparticles sucked into the microparticle suction flow path is 0 in every case of elapsed time is obtained. Then, at the determining step, the suction force obtained by increasing at a predetermined rate from the suction force in a case where the result in which the number is 0 in every case of elapsed time is obtained may be determined as the suction force which should be applied to the suction of the microparticles.

One skilled in the art may appropriately determine an amount by which the suction force which should be applied to the suction of the microparticle is increased from the suction force in a case where the result in which the number is 0 in every case of elapsed time is obtained according to factors such as the predetermined rate and the number of steps for decreasing suction force in the stepwise decrease in the suction force at the second repeating step S404, the value of $D_0$ adopted at the step 401, and/or the size of the flow path. For example, in a case of decreasing $D_0$ by 1 to 10%, a value obtained by adding a value of (the decreasing rate (that is, 1 to 10%)×1) to (the decreasing rate×5), for example, to the suction force with which the result in which the number is 0 in every case of elapsed time is obtained may be determined as the suction force which should be applied. For example, in a case where $D_0$ is decreased by 10% and the result in which the number is 0 in every case of elapsed time is obtained when the suction force is $D_0 - D_0 \times 80\%$, a value of $(D_0 - D_0 \times 80\%) + D_0 \times 20\%$, that is $D_0 - D_0 \times 60\%$ may be determined as the suction force which should be applied.

4. Third Embodiment (Microparticle Fractionating Device)

The present technology also provides a microparticle fractionating device which executes an optimizing method of the present technology. The microparticle fractionating device includes:

a control unit which executes a particle number counting step of detecting a time point when a microparticle passes through a predetermined position on a main flow path through which liquid containing the microparticle flows, sucking the microparticle from the main flow path to a microparticle suction flow path by the microparticle suction flow path with a predetermined suction force, and counting the number of microparticles sucked into the microparticle suction flow path; and a determining unit which determines an elapsed time from passage through the predetermined position with which the suction by the microparticle suction flow path should be performed on the basis of a time from the time point when the microparticle passes through the predetermined position on the main flow path until the suction is performed and the number of counted microparticles.

The microparticle fractionating device according to the present technology executes the optimizing method of the present technology. The optimizing method may be performed, for example, in a microchip including the main flow path through which the liquid containing the microparticle flows, the microparticle suction flow path coaxial with the main flow path, and a branch flow path branching from the main flow path. In other words, the microparticle fractionating device according to the present technology may be provided with the microchip. Examples of the microchip include, but are not limited to, the microchip described in above-described "1. Description of related technology", for example.

The control unit executes the particle number counting step. The control unit may further execute a repeating step of repeating the particle number counting step while changing the time from the time point when the microparticle passes through the predetermined position on the main flow path until the suction is performed. The control unit may further execute a second repeating step of repeating the particle number counting step and/or the repeating step while changing the suction force. The determining unit may determine the elapsed time from when the microparticle passes through the predetermined position with which the suction by the microparticle suction flow path should be performed and/or the suction force which should be applied to the suction of the microparticle on the basis of the number of microparticles counted at the particle number counting step or the particle number counting step and the repeating step, or the particle number counting step, the repeating step, and the second repeating step.

At the second repeating step executed by the control unit, the suction force is decreased stepwise at a predetermined rate from the suction force $D_0$, and the second repeating step may be performed until a result in which the number of the microparticles sucked into the microparticle suction flow path is 0 in every case of elapsed time is obtained. In this case, at the determining step, the determining unit may determine the suction force obtained by increasing at a predetermined rate from the suction force in a case where the result in which the number is 0 in every case of elapsed time is obtained as the suction force which should be applied to the suction of the microparticle.

The microparticle fractionating device of the present technology may include a detection area in the microparticle suction flow path. In the detection area, the microparticles sucked into the microparticle suction flow path may be counted.

At the determining step executed by the determining unit, a success rate of the suction to the suction flow path of the microparticles is calculated on the basis of the number of microparticles counted at the particle number counting step and the repeating step, and the second repeating step as needed, and the elapsed time from the passage through the predetermined position with which the suction by the microparticle suction flow path should be performed may be determined on the basis of the success rate.

The microparticle fractionating device according to the present technology may further include a light irradiation unit which irradiates the microparticle flowing through the main flow path with light, a detection unit which detects scattered light and/or fluorescence emitted from the microparticle, and a travel direction control unit which controls a travel direction of the microparticle flowing through the main flow path on the basis of data detected by the detection unit. Hereinafter, the light irradiation unit, the detection unit, and the travel direction control unit are described.

In the present technology, the light irradiation unit irradiates the microparticle flowing through the main flow path with light (excitation light). The light irradiation unit may include a light source which emits the excitation light, and an objective lens which condenses the excitation light on the microparticle which flows through the main flow path. The light source may be appropriately selected from a laser diode, a SHG laser, a solid-state laser, a gas laser, a super brightness LED and the like according to a purpose of analysis. The light irradiation unit may include other optical elements as needed in addition to the light source and the objective lens.

In the method of the present technology, the detection area on the main flow path may be irradiated with the light by the light irradiation unit. A position irradiated by the light may be the light irradiation position described with reference to FIG. 4 in above-described 2.(1). The light applied by the light irradiation unit may be one or two or more. The light applied by the light irradiation unit may be, for example, two lights of different wavelengths or two lights of the same wavelength. The irradiation of the light may emit scattered light and/or fluorescence from the microparticle. It may be determined whether or not the microparticle should be recovered by the emitted scattered light and/or fluorescence. Furthermore, the emitted scattered light and/or fluorescence may detect the passage of the microparticle through the predetermined position.

Furthermore, for example, by irradiation with the two lights, a speed of the microparticle in the flow path may be calculated from a distance between the two lights and a time required for the microparticle to pass between the two lights.

The microparticle fractionating device according to the present technology may further include a second light irradiation unit. The detection area in the microparticle suction flow path described with reference to FIG. 2 in above-described 2.(1) may be irradiated with light by the second light irradiation unit. The irradiation of the light may emit scattered light and/or fluorescence from the microparticle. By detecting the scattered light and/or the fluorescence, the number of microparticles sucked into the microparticle suction flow path may be counted.

Furthermore, the microparticle fractionating device according to the present technology may further include a dark field illumination system for detection of the fractionated microparticles, and/or a camera observation system for observing the fractionating portion. Moreover, the microparticle fractionating device according to the present technology may include a transmissive illumination system that illuminates a field of view observed by the camera observation system.

In the present technology, the detection unit detects the scattered light and/or fluorescence emitted from the microparticle by irradiation of light by the light irradiation unit. The detection unit may include a condensing lens which condenses the fluorescence and/or scattered light generated from the microparticle and a detector. As the detector, PMT, photodiode, CCD, CMOS and the like may be used, but this is not limited thereto. The detection unit may include another optical element as needed in addition to the condensing lens and the detector.

Furthermore, the microparticle fractionating device of the present technology may further include a second detection unit for detecting the light generated by the light applied from the second light irradiation unit.

The fluorescence detected by the detection unit and the second detection unit may be fluorescence generated from the microparticle itself and fluorescence generated from a substance labeled to the microparticle such as a fluorescent substance, for example, but this is not limited thereto. The scattered light detected by the detection unit and the second detection unit may be forward scattered light, side scattered light, Rayleigh scattering, and/or Mie scattering, but is not limited thereto.

Figure 10:
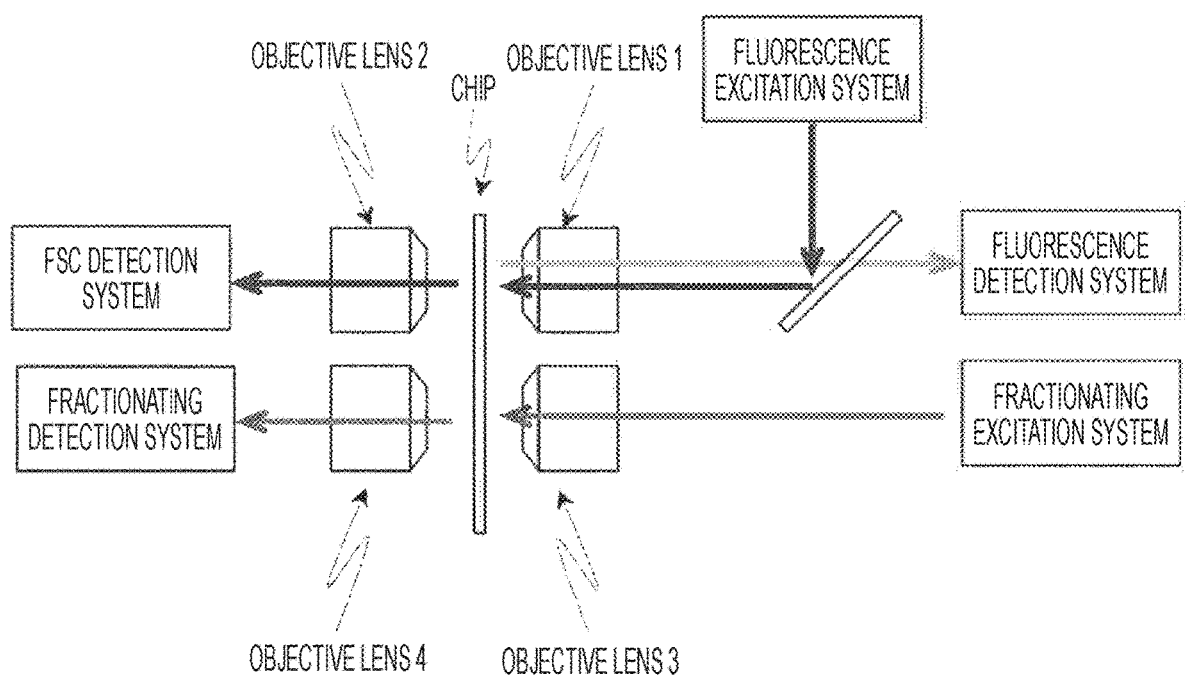
FIG. 10 is a view illustrating an example of a light irradiation unit and a detection unit.

In FIG. 10, an example of the light irradiation unit (fluorescence excitation system), the second light irradiation unit (fractionating excitation system), the detection unit (FSC detection system and fluorescence detection system), and the second detection unit (fractionating detection system) used in the present technology is illustrated.

The light irradiation unit irradiates the microparticle flowing through the microchip with the light for fluorescence excitation. The second light irradiation unit applies the light for detecting that the microparticle is fractionated in a microparticle fractionating flow path.

The detection unit may include a forward scattered light detection system and a fluorescence detection system. The detection systems may detect light generated by the irradiation of the light from the light irradiation unit to the microparticle. On the basis of the detected light, it is determined whether or not the microparticle should be fractionated may be performed by the travel direction control unit described below. Furthermore, on the basis of the detected light, the passage through the predetermined position of the microparticle may be detected by the control unit. Furthermore, on the basis of the detected light, calculation of a passing speed of the microparticle may be performed by the control unit.

The second detection unit may detect the light generated by the irradiation of the microparticle with the light from the second light irradiation unit. By the detection of the light, it may be detected that the microparticle is sucked into the microparticle suction flow path. The light detected by the second detection unit is preferably forward scattered light, and the forward scattered light may preferably be independent of a fluorescent marker.

As illustrated in FIG. 10, irradiation of the microchip with the light from the light irradiation unit may be performed through an objective lens. A numerical aperture (NA) of the objective lens may be preferably 0.1 to 1.5, more preferably 0.5 to 1.0.

Furthermore, the forward scattered light generated by the irradiation of the light by the light irradiation unit may be detected by the forward scattered light detection system after the passage through the objective lens. The numerical aperture (NA) of the objective lens may be preferably 0.05 to 1.0, more preferably 0.1 to 0.5.

Furthermore, the light irradiation position may be within a field of view of these objective lenses, and preferably both the light irradiation position and a branch portion may be present.

In the present technology, the travel direction control unit controls whether to allow the microparticle flowing through the main flow path to advance to the branch flow path or suck the same into the particle fractionating flow path on the basis of the data detected by the detection unit. The fluorescence and scattered light detected by the detection unit may be converted into an electrical signal. In other words, the microparticle fractionating device of the present technology may include an electrical signal conversion unit. It is possible that the electrical signal conversion unit is included in the travel direction control unit or not included in the travel direction control unit. The travel direction control unit may receive the electrical signal and determine an optical characteristic of the microparticle on the basis of the electrical signal. The travel direction control unit may change the flow in the flow path so that the microparticle travels to the microparticle fractionating flow path through an orifice in a case where the microparticle should be recovered on the basis of the determination result. The flow may be changed, for example, by decreasing the pressure in the pressure chamber. Furthermore, after the recovery of the microparticle, the travel direction control unit may change the flow in the flow path again. This change of the second flow may be performed by increasing the pressure in the pressure chamber. In other words, the travel direction control unit may control the pressure in the pressure chamber communicated with the orifice on the basis of the data detected by the detection unit. Furthermore, the travel direction control unit may control the flow of the liquid in the flow path provided to form the flow of the liquid from the orifice toward the main flow path, for example, a gate flow or the like. The travel direction control unit may have the function similar to that of the drive unit disclosed in Japanese Patent Application Laid-Open No. 2014-036604.

Note that the present technology may also have a following configuration.

[1] An optimizing method of a suction condition of a microparticle including:

a particle number counting step of detecting a time point when a microparticle passes through a predetermined position on a main flow path through which liquid containing the microparticle flows, sucking the microparticle from the main flow path to a microparticle suction flow path by the microparticle suction flow path with a predetermined suction force, and counting the number of microparticles sucked into the microparticle suction flow path; and a step of determining an elapsed time from passage through the predetermined position with which the suction by the microparticle suction flow path should be performed on the basis of a time from the time point when the microparticle passes through the predetermined position on the main flow path until the suction is performed and the number of counted microparticles.

[2] The method according to [1], further including:

a repeating step of repeating the particle number counting step while changing the time from the time point when the microparticle passes through the predetermined position on the main flow path until the suction is performed.

[3] The method according to [1] or [2], further including:

a second repeating step of repeating the particle number counting step and/or the repeating step while changing the suction force.

[4] The method according to [3], in which, at the second repeating step, the suction force is decreased stepwise at a predetermined rate, and the second repeating step is performed until a result in which the number of microparticles sucked into the microparticle suction flow path is 0 in every case of elapsed time is obtained.

[5] The method according to [4], in which, at the determining step, the suction force obtained by increasing at a predetermined rate from the suction force in a case where the result in which the number is 0 in every case of elapsed time is obtained is determined as the suction force which should be applied to the suction of the microparticle.

[6] The method according to any one of [1] to [5], in which, at the particle number counting step, the number of microparticles is counted in a predetermined position in the microparticle suction flow path.

[7] The method according to any one of [1] to [5], in which, at the particle number counting step, the number of microparticles is counted by detecting passage through a predetermined position in the microparticle suction flow path.

[8] The method according to [2], in which, at the determining step, a success rate of the suction to the microparticle suction flow path of the microparticles is calculated on the basis of the number of microparticles counted at the particle number counting step and the repeating step, and an elapsed time from the passage through the predetermined position with which the suction by the microparticle suction flow path should be performed is determined on the basis of the success rate.

[9] The method according to any one of [1] to [8] performed for optimizing the suction condition of the microparticle in a microchip including the main flow path through which the liquid containing the microparticle flows, the microparticle suction flow path coaxial with the main flow path, and a branch flow path branching from the main flow path.

[10] A microparticle fractionating device including:

a control unit which executes a particle number counting step of detecting a time point when a microparticle passes through a predetermined position on a main flow path through which liquid containing the microparticle flows, sucking the microparticle from the main flow path to a microparticle suction flow path by the microparticle suction flow path with a predetermined suction force, and counting the number of microparticles sucked into the microparticle suction flow path; and a determining unit which determines an elapsed time from passage through the predetermined position with which the suction by the microparticle suction flow path should be performed on the basis of a time from the time point when the microparticle passes through the predetermined position on the main flow path until the suction is performed and the number of counted microparticles.

REFERENCE SIGNS LIST

100 Microchip
101 Sample liquid inlet
102 Sample liquid flow path
103 Sheath liquid inlet
104 Sheath liquid flow path
105 Main flow path
106 Detection area
107 Fractionating portion
108 Branch flow path (discharging flow path)
109 Particle fractionating flow path
110 Branch flow path end
111 Fractionating flow path end
112 Gate flow inlet
201 Orifice
202 Counting area
601 Area where microparticle is sucked into microparticle suction flow path in a case of suction with suction force $D_0$
602 Microparticle
801 Area where microparticle is sucked into microparticle suction flow path in a case of suction with suction force $D_n$
802 Microparticle
901 Area where microparticle is sucked into microparticle suction flow path in a case of suction with suction force $D_z$

The invention claimed is:

1. An optimizing method of a suction condition of a microparticle comprising:

a particle number counting step of detecting a time point when a microparticle passes through a predetermined position on a main flow path through which liquid containing the microparticle flows, sucking the microparticle from the main flow path to a microparticle suction flow path by providing the microparticle suction flow path with a predetermined suction force, and counting the number of microparticles sucked into the microparticle suction flow path; and a step of determining an elapsed time from passage through the predetermined position with which the suction by the microparticle suction flow path should be performed on a basis of a time from the time point when the microparticle passes through the predetermined position on the main flow path until the suction is performed and the number of counted microparticles.

2. The method according to claim 1, further comprising:

a repeating step of repeating the particle number counting step while changing the time from the time point when the microparticle passes through the predetermined position on the main flow path until the suction is performed.

3. The method according to claim 2, further comprising:

a second repeating step of repeating the particle number counting step and/or the repeating step while changing the suction force.

4. The method according to claim 3, wherein, at the second repeating step, the suction force is decreased stepwise at a predetermined rate, and the second repeating step is performed until a result in which the number of microparticles sucked into the microparticle suction flow path is 0 in every case of elapsed time is obtained.

5. The method according to claim 4, wherein, at the determining step, the suction force obtained by increasing at a predetermined rate from the suction force until a desired number of particles has been sucked into the microparticle suction flow path is determined as the suction force which should be applied to the suction of the microparticle.

6. The method according to claim 2, wherein, at the determining step, a rate of the suction to the microparticle suction flow path of the microparticles is calculated on a basis of the number of microparticles counted at the particle number counting step and the repeating step, and an elapsed time from the passage through the predetermined position with which the suction by the microparticle suction flow path should be performed is determined on a basis of the rate.

7. The method according to claim 1,
wherein, at the particle number counting step, the number of microparticles is counted in a predetermined position in the microparticle suction flow path.

8. The method according to claim 1,
wherein, at the particle number counting step, the number of microparticles is counted by detecting passage through a predetermined position in the microparticle suction flow path.

9. The method according to claim 1 performed for optimizing the suction condition of the microparticle in a microchip including the main flow path through which the liquid containing the microparticle flows, the microparticle suction flow path coaxial with the main flow path, and a branch flow path branching from the main flow path.

10. A microparticle fractionating device comprising:
a control unit which executes a particle number counting step of
  detecting a time point when a microparticle passes through a predetermined position on a main flow path through which liquid containing the microparticle flows,
  sucking the microparticle from the main flow path to a microparticle suction flow path by providing the microparticle suction flow path with a predetermined suction force, and
  counting the number of microparticles sucked into the microparticle suction flow path; and
a determining unit which determines an elapsed time from passage through the predetermined position with which the suction by the microparticle suction flow path should be performed on a basis of a time from the time point when the microparticle passes through the predetermined position on the main flow path until the suction is performed and the number of counted microparticles.

* * * * *